United States Patent [19]

Furuichi

[11] 3,709,603
[45] Jan. 9, 1973

[54] ELECTROPHOTOGRAPHIC COPYING MACHINE

[75] Inventor: Masayoshi Furuichi, Tokyo, Japan

[73] Assignee: Katsuragawa Denki Kabushiki Kaisha, Tokyo-to, Japan

[22] Filed: Nov. 4, 1970

[21] Appl. No.: 86,773

[30]    Foreign Application Priority Data

Nov. 7, 1969    Japan.......44/105957

[52] U.S. Cl. ..........................355/60, 355/3, 355/51, 355/57, 355/66
[51] Int. Cl. .............................................G03b 27/70
[58] Field of Search............355/3, 51, 57, 60, 65, 66

[56]        References Cited

UNITED STATES PATENTS 3,609,031   9/1971   Kinoshita.............................355/3 X
2,391,044   12/1945  Terry....................................355/24
3,552,848   1/1971   Van Wagner......................355/3 X
3,507,576   4/1970   Linde ...................................355/65

Primary Examiner—Samuel S. Matthews
Assistant Examiner—E. M. Bero
Attorney—Bosworth, Sessions, Herrstrom & Cain

[57]    ABSTRACT

In an electrophotographic copying machine wherein the light image of an original is projected upon a photosensitive element carried by a rotary drum through a pair of confronting relative mirrors and a focusing lens located between these two reflective mirrors, the mirrors are moved in the horizontal direction toward and away each other, and the lens is moved in the vertical direction over the same distance as the reflective mirrors concurrently therewith. Further, the lens is moved in the horizontal direction whereby to vary the magnifying power.

3 Claims, 3 Drawing Figures

PATENTED JAN 9 1973

INVENTOR

MASAYOSHI FURUICHI

BY Bosworth, Sessions,
Herrstrom + Cain

ATTORNEYS

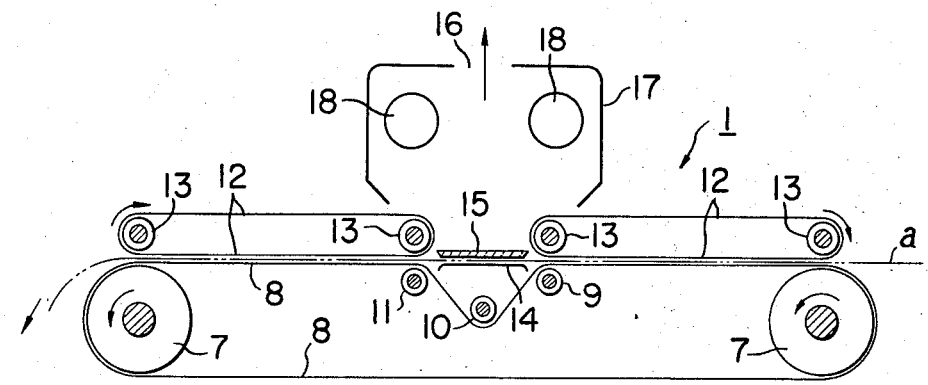
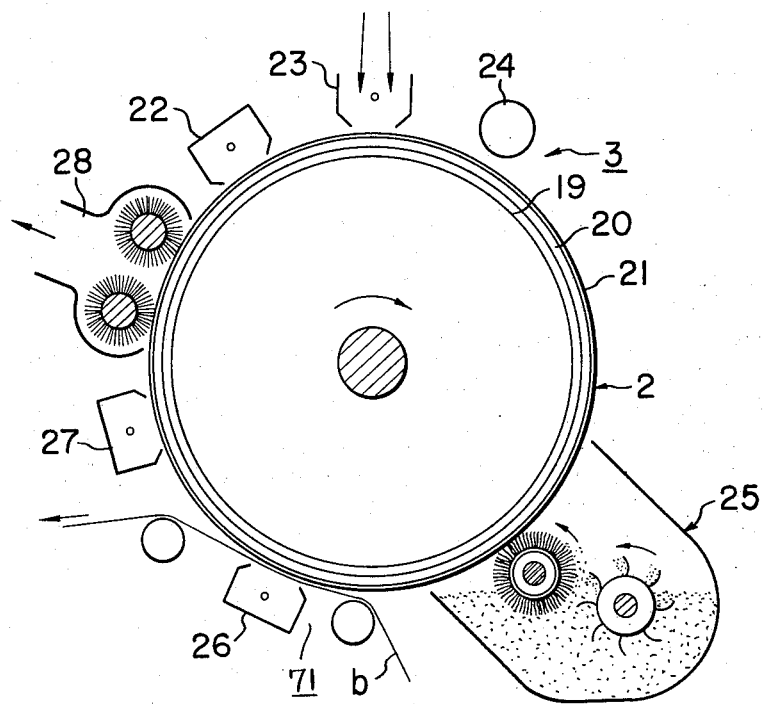

3,709,603

ELECTROPHOTOGRAPHIC COPYING MACHINE

BACKGROUND OF THE INVENTION

This invention relates to an electrophotographic copying machine and more particularly to an improved mechanism for varying the magnifying power of the copying machine.

In an electrophotographic copying machine of the type wherein the light image of an original is projected upon a photosensitive element carried by a rotary drum through a pair of confronting reflective mirrors and a focusing lens located between these two reflective mirrors it is necessary to vary the magnifying power or to obtain copies larger or smaller than the original. Although a number of approaches have been proposed, they are bulky and expensive.

SUMMARY OF THE INVENTION

It is an object of this invention to provide a novel electrophotographic copying machine.

A more specific object of this invention is to provide a new and improved mechanism for varying the magnifying power of the copying machine employing a photosensitive element carried by a rotary drum.

Briefly stated, in accordance with this invention there is provided an electrophotographic copying machine of the type comprising a first reflective mirror to reflect the light image of an original, a photosensitive element mounted on a rotary drum, a second reflective mirror positioned to oppose the first reflective mirror to reflect the light image toward the photosensitive element, means positioned between the photosensitive element and the second reflective mirror for depositing an electric charge on the surface of the photosensitive element and a lens located between first and second reflective mirrors so as to successively focus the light image on the photosensitive element to form an electrophotographic copy, characterized by means for independently holding the first and second reflective mirrors, means for horizontally moving the first and second reflective mirrors toward and away each other by equal distance, means interlocked with said moving means for vertically moving the lens by the same distance as the horizontal movement of the first and second reflective mirrors and means for horizontally moving the lens whereby to vary the magnifying power.

BRIEF DESCRIPTION OF THE DRAWING

In the accompanying drawing:

FIG. 2 shows a diagrammatic side view of an original carrier; and

FIG. 3 shows a side view of the electrophotographic machine.

DESCRIPTION OF THE PREFERRED EMBODIMENT

Figure 1:
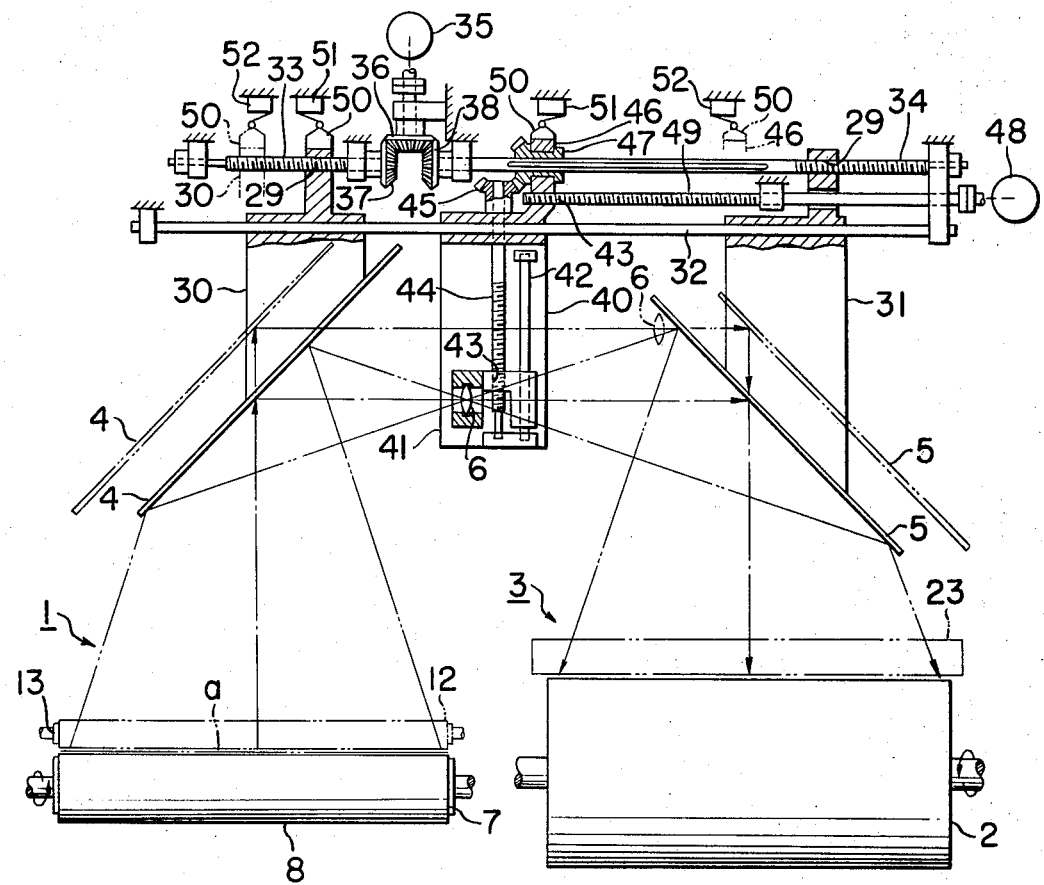
FIG. 1 shows a front elevation, partly in section, of an electrophotographic copying machine embodying this invention.

Referring now to FIG. 1 there is shown a copying machine embodying the invention. There is provided an original conveyor 1 arranged to convey an original *a* at a definite speed in a direction perpendicular to the plane of the drawing with the original faced upwardly. The detail of the conveyor will be described later with reference to FIG. 2. To the right of the conveyor is disposed an electrophotographic image forming device 3 including a rotary drum 2 which carries a photosensitive element and is rotated synchronously with the original conveyor 1. A first reflective mirror 4 is disposed above conveyor 1 at an angle of 45° with respect to the original or horizontal to reflect the light image of the original to the right or in the horizontal direction. A second reflective mirror 5 is disposed above the image forming device to oppose the first reflective mirror 4 to reflect the light image from the first reflective mirror toward the periphery of the drum 2. An optical lens 6 is disposed intermediate the first and second reflective mirrors to focus the light image of the original on the surface of the photosensitive element carried by the drum (to be described later) thus continuously copying the original to form an electrophotographic copy.

As diagrammatically shown in FIG. 2, the original conveyor 1 comprises a pair of spaced apart parallel rollers 7, an endless conveyor belt 8 passed around rollers 7 and guide rollers 9, 10 and 11 to cause the middle portion of the upper run of the belt to pass along a V shaped path. A pair of clamping or pressing belts 12 are provided around rollers 13 to overlay the upper run of belt 8 excepting V shaped portions thereof between guide rollers 9 and 11. Belts 8 and 12 are moved in the same direction and at the same speed. A support 14 with its upper surface painted white is disposed between rollers 9 and 11 at the same level as the upper run of belt 8 and a transparent guide 15 is disposed above support 14 with a small gap just enough to receive original *a*. A casing 17 having a slot 16 at its upper end is provided above guide 15 to contain lamps 18 for illuminating the original through transparent guide 15. Thus, the light image of the original is transmitted upwardly through slit 16 to the first reflective mirror 4.

Although any well known electrophotographic image forming device may be used, in the example illustrated in FIG. 3, the device 3 comprises a photosensitive element including an electrode layer 19, a photosensitive photoconductive layer 20 having a plurality of charge trap levels or impurity levels to manifest persistent internal polarization, and a highly insulative layer 21 integrally bonded to one surface of the photoconductive layer 20 and the rotary drum 2. The photosensitive element is mounted about the periphery of the drum 2 with highly insulative layer 21 faced outwardly. About the periphery of the rotary drum 2 are disposed a first corona discharge unit 22 to deposit a charge of one polarity upon the surface of the highly insulative layer, a top opened cylindrical second corona discharge unit 23 to deposit a charge of the opposite polarity on the surface of the highly insulative layer concurrently with the projection of the light image of the original through its opened top end, whereby to form a latent image on the surface of the highly insulative layer corresponding to the light image, and a source of light for illuminating the latent image with uniform light 24 for improving the contrast of the intermediate tone of the reproduced image. There are also provided a developing device 25 for developing the latent image as a powder image, a transfer printing device 71 having a third corona discharge unit 26 for transfer printing the powder image onto a recording paper b, an AC corona discharge unit 27 for erasing the electrostatic latent image remaining on the photosensitive element after transfer printing, and a cleaning device 28 including rotating brushes for removing the remaining developing powder from the surface of the highly insulative layer to prepare for the next cycle of operation. The powder image is heated after it has been transfer printed onto the recording paper in a manner well known in the art for fixing the image.

According to this invention, in order to vary the magnifying power or the ratio between dimensions of the original and of the reproduced image there are provided means for horizontally moving first and second reflective mirrors in the opposite directions over an equal distance and means to move vertically lens 6 over the same distance as the horizontal movement of the reflective mirrors and to move the lens in the horizontal direction over a desired distance.

Referring again to FIG. 1, first and second reflective mirrors 4 and 5 are supported by supporting arms 30 and 31, respectively, which are provided with threaded openings 29 at their upper ends for receiving threaded rods 33 and 34, respectively. These reflective mirrors are also supported by a horizontal guide rod 32 to be slidable therealong. The inner ends of threaded rods 33 and 34 are driven by an electric motor 35 through bevel gears 36, 37 and 28 to move the reflective mirrors in the horizontal direction but in the opposite directions by the same distance. An arm 40 having a threaded opening 43 is slidably mounted on guide rod 32 and a lens holder 41 holding the lens 6 is moved in the vertical direction along a vertical guide rod 42 by means of a threaded rod 44 received in a threaded opening 43 in lens holder 41. A threaded feed rod 49 parallel to the guide rod 32 is received in threaded opening 43 for feeding the lens in the horizontal direction. On the upper end of threaded rod 44 is secured a bevel gear 45 which cooperate with a bevel gear 47 received in a trunnion 46 on the upper end of holding arm 40. A splined portion of threaded rod 34 extends through bevel gear 47 so that the lens is moved in the vertical direction over a distance equal to the horizontal movement of the reflective mirrors 4 and 5. The outer end of threaded rod 49 is connected to another driving motor 48 to move arm 40 and hence lens 6 in the horizontal direction independently of the vertical movement thereof.

In FIG. 1, various parts of the copying machine are shown in solid line positions for providing a 1:1 magnifying power. To reduce the magnifying power to one-half, for example, motor 35 is operated to move the reflective mirrors in the opposite directions to the positions shown by dash and dot lines over a distance calculated from the focal length of lens 6 and the desired magnifying power. At the same time lens 6 is raised by the same distance through bevel gears 36, 38, the splined portion of screw rod 34, bevel gears 47, 45 and threaded rod 44. Further, driving motor 48 is operated to bring lens 6 to a position shown by dotted lines which is rather close to the reflective mirror 5 at its new position. To precisely position the reflective mirrors and lens, there are provided suitable electromagnetic clutches and braking devices (not shown) for the driving systems and limit switches 51 and 52 actuated by actuators 50 carried by arms 30 and 40, respectively, for controlling the electromagnetic clutches and driving motors 35 and 38.

It is to be understood that according to the novel copying machine it is possible not only to obtain copies of the original at any magnifying power smaller than one-half but also to obtain magnified copies at any magnifying power by moving the lens in the direction opposite to that of reduced magnifying powers.

Different from a prior art copying machine wherein two reflective mirrors are moved vertically by a common supporting frame, according to this invention since these reflective mirrors are supported by independent supporting frames or arms it is possible to reduce the size of the machine. Especially when the light image of the original is projected upon the photosensitive element concurrently with the application of the second field, it is necessary to arrange the second corona discharge unit 23 between the second reflective mirror 5 and the rotary drum 2 in which case the vertical movement of the second reflective mirror 5 is limited by the second corona discharge unit 23. For this reason, the prior art copying machine has limited the selection of the lens and miniaturization of the machine.

I claim:

1. In an electrophotographic copying machine of the type comprising a first reflective mirror to reflect the light image of an original, a photosensitive element mounted on a drum rotatable about an axis, a second reflective mirror positioned to oppose said first reflective mirror to reflect said light image toward said photosensitive element, means positioned between said photosensitive element and said second reflective mirror for depositing electric charge on the surface of said photosensitive element and a lens located between said first and second reflective mirrors so as to successively focus said light image on said photosensitive element to form an electrophotographic copy, the improvement which comprises guide means for supporting said first and second reflective mirrors for movement toward and away from each other only in directions parallel to the axis of rotation of said drum, means for moving said mirrors along said guide means, means interlocked with said means for moving said mirrors for moving said lens the same distance as said mirrors in a direction normal to the direction of movement of said mirrors, and means for moving said lens in a direction parallel to the direction of movement of said mirrors whereby to vary the magnifying power.

2. The electrophotographic copying machine according to claim 1 wherein said guide means comprise a guide rod for slidably supporting said mirrors and wherein said mirrors are moved along said guide rod by a first driving motor and wherein said lens is carried by an arm which is moved along said guide rod by a second driving motor.

3. The electrophotographic copying machine according to claim 1 including means for moving said original at a predetermined speed and wherein said rotatable drum is positioned beneath said second reflective mirror and is rotable at the same peripheral speed as the speed of said original; said photosensitive element includes an electrode layer, a photoconductive layer manifesting persistent internal polarization and a highly insulative layer; said photosensitive element being mounted on said rotable drum with said highly insulative layer faced outwardly; a first corona discharge unit for depositing a charge of one polarity on the surface of said highly insulative layer; said charge depositing means comprising a second corona discharge unit positioned beneath said second reflective mirror for depositing a charge of the opposite polarity on the surface of said highly insulative layer concurrently with the projection of said light image through said second corona discharge unit; whereby to form an electrostatic latent image on the surface of said highly insulative layer corresponding to said light image; a developing device to form a visible image of said latent image; and a transfer printing device to transfer print said visible image onto a recording paper.

* * * * *